United States Patent [19]

Schultz et al.

[11] Patent Number: 4,691,102

[45] Date of Patent: Sep. 1, 1987

[54] BOREHOLE COMPENSATION METHOD AND APPARATUS USING VARIATIONS IN RELATIVE BOREHOLE COMPONENTS

[75] Inventors: Ward E. Schultz; Harry D. Smith, Jr., both of Houston, Tex.

[73] Assignee: Halliburton Company, Duncan, Okla.

[21] Appl. No.: 745,723

[22] Filed: Jun. 17, 1985

[51] Int. Cl.$^4$ .............................................. G01V 5/00
[52] U.S. Cl. ..................................... 250/256; 250/265; 250/266
[58] Field of Search ........... 250/256, 265, 266, 361 R, 250/363 R

[56] References Cited

U.S. PATENT DOCUMENTS

| 3,321,625 | 5/1967 | Wahl | 250/256 |
| 3,521,063 | 7/1970 | Tittman | 250/266 |
| 3,858,037 | 12/1974 | Moore et al. | 250/256 |
| 3,887,805 | 6/1975 | Schuster | 250/266 |
| 4,529,877 | 7/1985 | Arnold | 250/266 |

*Primary Examiner*—Janice A. Howell
*Assistant Examiner*—David P. Porta
*Attorney, Agent, or Firm*—William J. Beard

[57] ABSTRACT

Compensation of photoelectric absorption measurements for borehole effects during nuclear logging of downhole earth formations is accomplished by detecting low energy gamma radiations entering two detectors in the logging tool along paths having substantially constant formation components but varying borehole components.

7 Claims, 8 Drawing Figures

BOREHOLE COMPENSATION METHOD AND APPARATUS USING VARIATIONS IN RELATIVE BOREHOLE COMPONENTS

BACKGROUND OF THE INVENTION

The present invention relates to methods and apparatus for logging earth formations penetrated by a borehole, and more particularly to methods and apparatus for compensating for borehole effects while logging such formations using nuclear means. While the invention will be particularly described with respect to methods and apparatus for compensated density logging of downhole earth formations (wherein gamma rays are emitted from a logging tool into the formation and Compton scattered back to the tool), the invention disclosure should be read with the understanding that it is equally applicable to borehole compensation of other nuclear logging measurements, such as natural gamma ray, neutron porosity, and so forth.

In recent years nuclear well logs measuring the density of downhole earth formations have become increasingly important to petroleum engineers and log analysts. Density logs are a standard means for determining formation porosity. When borehole conditions are reasonable, density readings can be combined with estimates of fluid and matrix densities to yield accurate porosity values. Measurements of the photoelectric factor ($P_e$) have assisted lithology identification, and thereby improved the estimation of matrix density. However, previous $P_e$ measurements have often been adversely affected by rugose boreholes and/or the presence of barite in the drilling mud.

Porosities derived from density logs can be combined with measurements from resistivity or pulsed neutron logs to produce calculations of formation water saturations. Other combinations of density log data with that from sonic and/or neutron porosity logs can be used to determine formation lithology and to indicate formations with significant gas saturations. In certain areas even unsupplemented density log data can provide sufficient information to evaluate the formations of interest.

Density logging is based on the detection of attenuated gamma rays emitted from a radioactive source in a downhole tool. The gamma rays from the source penetrate through the toolcase, borehole, and formation. A fraction of these gamma rays are Compton scattered into and counted by one or more gamma ray detectors in the tool. The attenuation the gamma rays undergo between the source and detector(s) can, under certain conditions, be very simply related to formation bulk density. As a reasonable generalization, the count rate will decrease exponentially as the density of the formation/borehole system increases, and also as the source-detector spacing increases.

Gamma rays interact with matter principally by three processes: photoelectric absorption, pair production, and Compton scattering. Of these processes, only Compton scattering is not highly dependent upon the specific elements in the medium, depending instead upon only the density of the medium (the density being directly related to the number of electrons per unit volume). Photoelectric absorption and pair production, on the other hand, are strongly related to the atomic number Z of the nuclei in the formation and exhibit very strong gamma ray energy dependence. Therefore, current density logging tools are designed to respond primarily to Compton scattered gamma radiation, the selective response to such Compton scattered gamma radiation being achieved by proper selection of gamma ray energies and proper detector shielding.

Typically, present day density tools therefore measure density by observing an integrated Compton scattered gamma ray count rate over a broad, predetermined energy band. Since the higher density formation materials have higher gamma attenuation coefficients, the integrated count rate at the gamma ray detector in the logging tool will be lower when higher density material is present between the source and the detector. Using predetermined relationships, the count rates can then be converted into a measure of the formation density, and hence porosity.

In many tools, two detectors are provided and the data from both detectors are used simultaneously to provide borehole (especially mudcake) compensation. This is particularly true in compensated density logging, which uses a $Cs^{137}$ source collimated into the formation and two collimated gamma ray detectors.

The conventional compensation concept is based upon the idea that when a borehole attenuating factor such as mudcake is present, the count rates at both detectors will be affected. Since mudcake occupies a larger percentage of the volume sensed by the short-spaced detector, the short-spaced count rate will change more than the long-spaced count rate. This will cause the short-spaced detector to indicate an apparent density which is different from that indicated by the long-spaced detector. The difference between these apparent densities is directly proportional to the amount of correction which needs to be applied to the long-spaced density to obtain the compensated density. Such compensation concepts and methods are well known. The concepts also rely on the fact that the density measurements are made by detecting higher energy scattered gamma rays which are more penetrating and are not isotropically distributed in the formation.

The addition of a photoelectric factor ($P_e$) measurement to density logging has proved to be quite useful in lithology identification. However, because of limited depth of investigation and strong sensitivity to elements with large atomic number, $P_e$ measurements have been adversely affected by borehole rugosity, mudcake, washout, and barite in the drilling mud. A need therefore remains for a borehole logging method and apparatus which will give an accurate and repeatable determination of formation density, a reduction in borehole sensitivity for lithology determination, and a less borehole sensitive $P_e$ measurement.

SUMMARY OF THE INVENTION

Briefly, according to the present invention a borehole logging method and apparatus are disclosed in which differences in the relative formation components of the signals in two detectors are minimized, and the relative borehole components are made to vary significantly. That is, in contrast to the traditional method described above, the compensation utilizes variations in the relative borehole, rather than the formation, components. This variation can be provided in a number of different ways. For example, energy discrimination, time dependence or mechanical means may be used. With the latter, differences in borehole response can be obtained, for example, by varying the azimuthal and/or vertical collimation aperture widths at each of two detectors.

Previously, the photoelectric factor $P_e$ has commonly been obtained only from the longer spaced of the two density detectors. In a preferred embodiment of the present invention, a separate $P_e$ is measured from each detector. It has been determined from test formation and well data that the short-spaced detector $P_e$ is less sensitive to mudcake. As taught herein, this is at least in part caused by a much tighter gamma ray collimation in the short-spaced detector, coupled with the very limited penetration of the photoelectrically sensitive low energy gamma rays. Conversely, a larger collimator opening in the long-spaced detector increases the mudcake effect on the relatively shallow $P_e$ measurement. Such $P_e$ measurements, with different relative borehole sensitivities, then provide a mechanism for identifying and reducing erroneous $P_e$ values in zones where mudcake or washout obscures the true photoelectric properties of the formation.

It is therefore a feature of the present invention to provide an improved borehole logging method and apparatus for measuring the properties of downhole earth formations; such a method and apparatus which provide compensation for borehole effects; in which a first detector within the borehole measures a predetermined radiation entering the borehole along a first predetermined path, and a first signal is then generated which is representative of the radiation so measured; in which a second detector within the borehole measures radiation of the same kind entering the borehole along a second predetermined path different from the first path, and a second signal is then generated which is representative of the radiation so measured; in which the first and second paths are selected such that difference in the relative formation components of the first and second signals are minimized, and the relative borehole components thereof are varied; in which the borehole effects upon the signals are then determined; and to accomplish the above features in an accurate, sensitive, versatile, and reliable method and apparatus readily suited to the widest possible use in the borehole measurement of the properties of earth formations.

Other features and advantages of the invention will be apparent from the following description, the accompanying drawings, and the appended claims.

DESCRIPTION OF THE PREFERRED EMBODIMENTS

Figure 1:
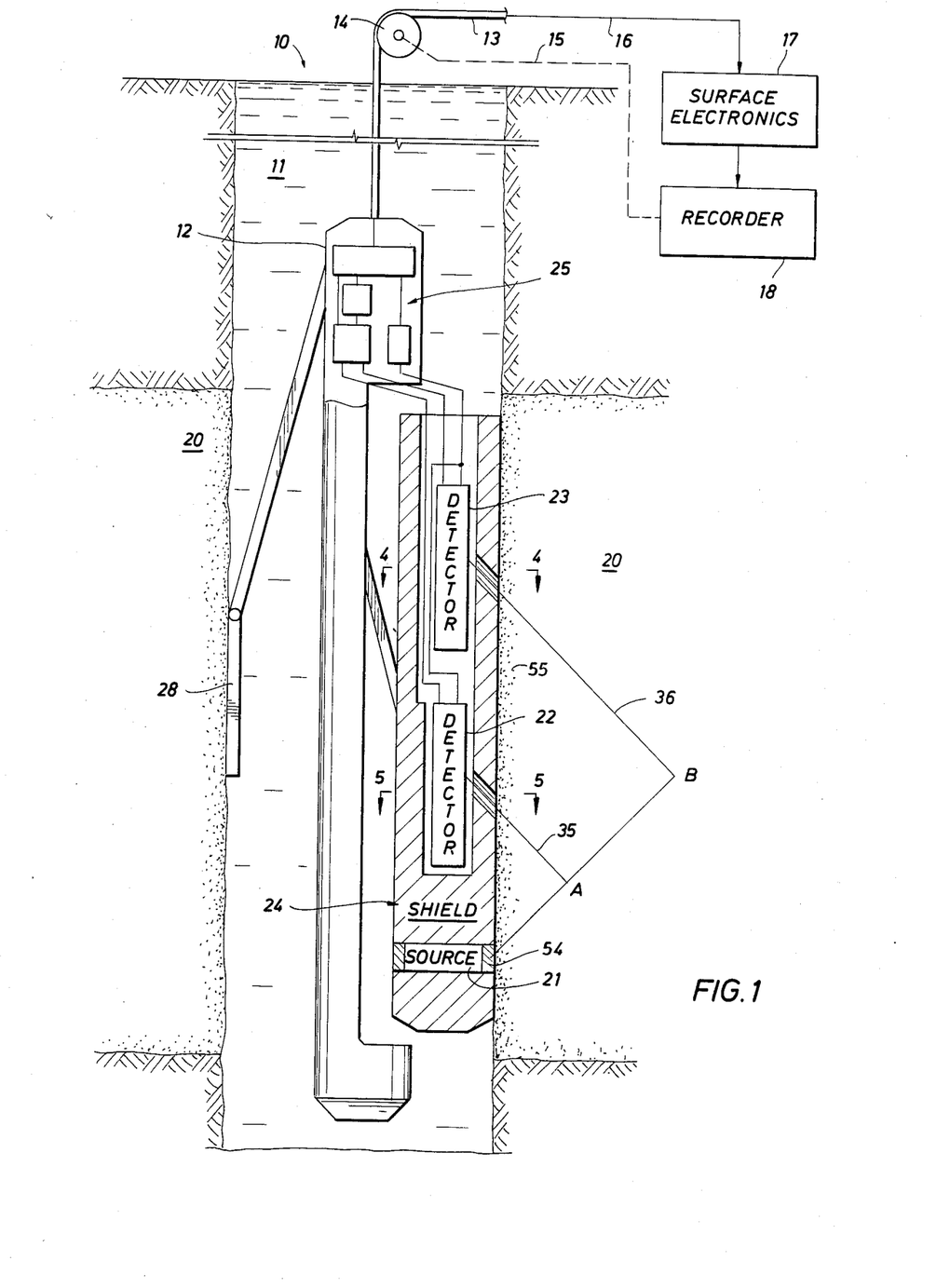
FIG. 1 is a figurative illustration showing a well logging system for performing earth formation measurements in a borehole according to the present invention.

With reference to the drawings, the new and improved apparatus for measuring the density of downhole earth formations penetrated by a borehole, and the method therefor according to the present invention, will be described. FIG. 1 shows schematically a well logging system suitable for performing the present invention. As shown therein, a well borehole 10 is filled with a borehole fluid 11 and penetrates the earth formations 20 to be investigated. A downhole well logging sonde 12 is suspended in the borehole 10 by means of a conventional armored logging cable 13, in a manner known in the art. Cable 13 provides for raising and lowering the sonde through the borehole and contains one or more electrical conductors 16 for communicating between the sonde 12 and a surface electronics package 17, as desired.

A sheave wheel 14 at the surface, over which cable 13 passes, is electrically or mechanically coupled, as indicated by dotted line 15, to a well logging recorder 18. Recorder 18 may comprise an optical recorder or magnetic tape, or both, as known in the art, for recording the measurements made by the downhole sonde 12 as a function of the depth in the borehole of the sonde 12.

In the downhole sonde 12, a gamma ray source 21, such as a 1.5 curie $Cs^{137}$ source (emitting gamma rays having initial energies of 0.66 MeV), is separated from near and far gamma ray detectors 22 and 23, respectively, by a suitable tungsten gamma ray shield and pad housing 24. Shield 24 shields the detectors 22 and 23, in part, from gamma rays emitted directly toward them from the gamma ray source 21. Detectors 22 and 23, which have spectral capabilities and are preferably NaI(Tl) crystals with low noise photomultiplier tubes, are connected in turn to control and telemetry electronics unit 25 which controls and powers the detectors, receives count rate and energy information therefrom, and telemeters information measured by the detectors to the surface by means of the logging cable 13.

A skid 28 decentralizes the sonde 12 in borehole 10 and holds the sonde tightly against the wall of the borehole, to reduce mudcake and washout effects. The mudcake and washout effects, however, are not entirely eliminated in most cases. Therefore, as discussed above, many dual detector nuclear logging systems commonly employ borehole compensation using data from both detectors simultaneously. This is particularly true in compensated density logging as shown in FIG. 1.

As with other density tools, the present invention measures density from the attenuation of gamma rays traversing the formation 20 between the source 21 and detectors 22 and 23. A reduction in the number of observed gamma rays implies an increase in formation density. For energies above about 125 KeV, in most formations the attenuation is caused by Compton scattering with electrons. Therefore, tool response is related to formation electron density ($\rho_e$) rather than actual bulk density ($\rho_b$):

$$\rho_e = \frac{2\bar{Z}}{\bar{A}} \rho_b, \tag{1}$$

where $\bar{Z}$ and $\bar{A}$ are average atomic number and atomic weight of the formation, respectively.

By convention, density tools are normally calibrated to match the bulk density of water-saturated limestone rather than electron density. The measured apparent density ($\rho_e$) from sonde 12 is thereby related to electron density by:

$$\rho_a = 1.0704\rho_e - 0.1883 \tag{2}$$

Using this procedure, $\rho_b = \rho_a$ for water-filled limestone and is also a good approximation for liquid-saturated sand and dolomite. However, a correction is required to obtain $\rho_b$ for materials such as anhydrite, gypsum, halite, sylvite and gas bearing formations.

Below 125 KeV another attenuation mechanism, photoelectric absorption, becomes significant. In general, the photoelectric absorption cross section (probability) is related to two variables: the gamma ray energy (E), and the atomic number (Z) of the material through which the gamma ray is passing:

$$\text{photoelectric absorption} \sim Z^{4.6}/E^3$$

This expression states that: (1) photoelectric absorption is important only at low energies, and (2) the amount of absorption is strongly related to the atomic number of the elements or materials involved. If an energy range is selected below 125 KeV which is sensitive to photoelectric absorption, then the observed count rate in this low energy range will fluctuate with changes in Z as well as with changes in formation density. Normalization, via a ratio, to the count rate in a higher energy range which is affected by density changes, but not Z changes, will result in a parameter which is sensitive to photoelectric absorption effects alone. Such a ratio can be converted via predetermined test formation relationships into a measurement of $P_e$, the photoelectric factor of the formation. $P_e$ is defined by the following:

$$(3) \quad P_e = (Z_e/10)^{3.6}$$

where $Z_e$ is the effective atomic number of the formation. For individual elements $Z_e = Z$. For mixtures, $Z_e$ is a weighted combination of the atomic numbers of the elements in the mixture. $Z_e$, and hence $P_e$, are strongly influenced by the highest atomic number element present. For this reason $P_e$ is functionally related to lithology type, since silicon, calcium, and magnesium (in sand, lime, and dolomite) have significantly different atomic numbers. General applications for $P_e$ measurement from density tools, and details of the general underlying physics associated with the measurement, are well known in the art.

Figures 2, 3, 4:
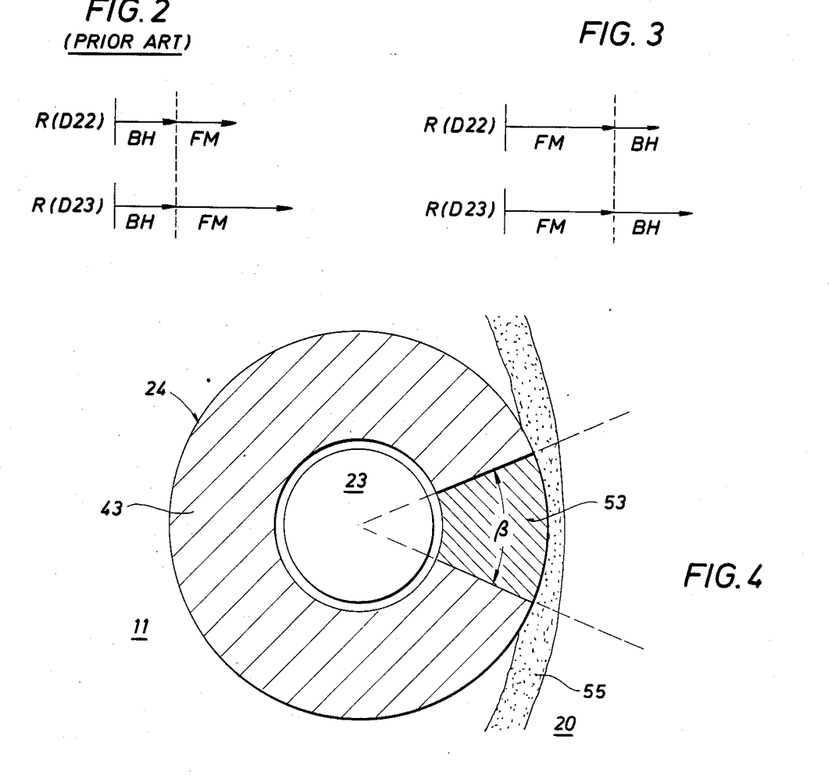
FIG. 2 is a schematic representation of the relative detector responses and response components with conventional compensation methods.
FIG. 3 is a schematic representation similar to FIG. 2 of the relative detector responses and response components resulting from the compensation method according to the present invention.
FIG. 4 is a schematic cross-sectional view taken generally on line 4—4 in FIG. 1.

Summarizing and applying the above discussion more specifically, and with reference to FIG. 1, it will now be seen that the density compensation principle is based upon the fact that the relative attenuation from the borehole (principally caused by the mudcake or washout) and from the formation along path S→A→D22 (from "S" (source 21), to point A, to D22 (detector 22)) is different from that along path S→B→D23. The entire source-to-detector spacing is involved in the formation signals because of the more penetrating nature of the higher energy gamma rays which are detected. The borehole components along each of these paths are roughly the same, since the detected higher energy gamma rays from the formation tend to retain the collimation features induced by the source. However, a much larger formation component exists along path S→B→D23. The relative detector responses R(D22) and R(D23) can be visualized as depicted in FIG. 2, where the respective borehole components BH are equal, but the formation components FM differ as described.

Hence, in a given formation, a change in mudcake thickness will cause a bigger fractional change in the response in detector 22. The formation response with no mudcake, as described earlier, is represented mathematically by:

$$R(FM) = f(R(D1), R(D2)). \tag{4}$$

As is well known, the compensation is then spatially achieved by causing the relative formation response to vary while holding the borehole response constant.

According to the present invention, borehole compensation can be based around the entirely different principle of minimizing differences in the formation components of the signals in two detectors, while varying the relative borehole components significantly. Schematically, this is represented in FIG. 3, where the respective formation components FM are equal, but the borehole components BH differ. As in conventional compensation methods, the true formation response R(FM) is given by:

$$R(FM) = f'(R(D1), R(D2)). \tag{5}$$

The key difference is that the compensation mechanism is based around variation in the relative borehole, rather that the formation, components. The borehole component can be varied by any appropriate means, as desired, such as energy discrimination, time dependence, mechanical means, and so forth (optimizing, of course, for the particular variable which is to be measured).

In a preferred embodiment, the present invention lends itself well to the photoelectrically sensitive lithology ($P_e$) measurement from a compensated density tool such as tool 12, using mechanical means to achieve variations in the borehole component. The low energy scattered gamma rays comprising the photoelectric (not the Compton) source distribution for signals measured in detectors 22 and 23 of the tool may be seen to be originating in a small volume of the formation immediately adjacent to each detector, since these low energy gamma rays have a very limited range in earth formations. As described more particularly by Bertozzi, Ellis, and Wahl (Bertozzi, W., Ellis, D. V., and Wahl, J. S. "The Physical Foundation of Formation Lithology Logging with Gamma Rays", Geophysics, Vol. 46, No. 10 (October, 1981), pp. 1439-1455), this source is generally within about 2-3 cm. of the tool housing and is roughly isotropically distributed. Hence the photoelectric "source"-to-detector spacing is approximately the same for each detector, and hence the FM components in FIG. 3 are approximately the same.

In the present invention, the physical location and the energy of the $Cs^{137}$ source 21 in the tool in fact have little to do with the effective source of the shallow $P_e$ measurement. This fact is also evidenced in that $P_e$ can similarly be measured using natural gamma rays from K-U-Th in the formation. (On this point see Smith, H. D., Jr., Robbins, C. A., Arnold, D. M., Gadeken, L. L., and Deaton, J. G., "A Multi-Function Compensated Spectral Natural Gamma Ray Logging System", paper SPE 12050 presented at the SPE 58th Annual Technical Conference and Exhibition, San Francisco, Oct. 5-8, 1983.)

Since the formation path lengths in this case are similar, mechanical means may be used in the lithology measurement to vary the relative borehole path lengths into the two detectors. When varied significantly, compensation for the borehole effects can then be achieved according to the present invention. Thus, in a preferred embodiment, differences in borehole response are obtained by varying the azimuthal and/or vertical aperture width at the two (or more) detectors, rather than variations in the source-to-detector spacing.

Figure 5:
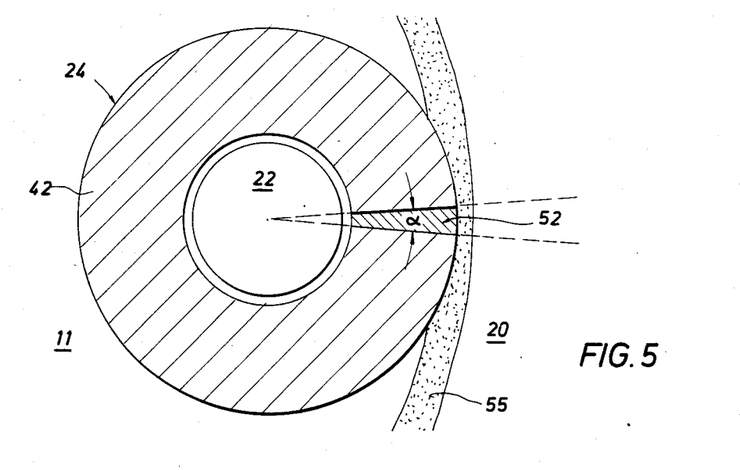
FIG. 5 is a schematic cross-sectional view similar to FIG. 4 taken generally on line 5—5 in FIG. 1.

FIGS. 4 and 5 show such a variation in the detector aperture widths. Detectors 22 and 23 are surrounded by respective portions 42 and 43 of shielding 24. Respective beryllium "windows" or apertures 52 and 53 have been inserted into the shielding 24. A similar beryllium window 54 (FIG. 1) is provided over the source 21. The beryllium windows 52 and 53 over the detectors improve the transmission of scattered gamma rays into the housing from the formation, particularly low energy photons that are required for determining $P_e$. The beryllium window 54 over source 21 enables a greater number of properly collimated high energy gamma rays to enter the formation 20.

Detector 23 (FIG. 4) has a relatively large opening 53, resulting in radiation collimation with a large azimuthal opening angle ($\beta$). Detector 22 has a considerably smaller opening angle ($\alpha$) in its aperture 52 through its shielding 42. As can be clearly seen from FIGS. 4 and 5, therefore, detector 23 has a larger fraction of radiation transmitted through the mud and mudcake 55 than detector 22, especially when non-radial paths are considered.

In the preferred embodiment, if the short-spaced detector is designed like detector 22, and the long-spaced detector like detector 23, then compensation is preferably achieved using detector 22 as the primary measurement, since it will be less sensitive to borehole effects. Experiments verifying the principles of the present invention have shown that angular effects dominate over the $Cs^{137}$ source-to-detector spacing for the $P_e$ measurement. In fact, the short-spaced detector with a narrow collimation slot requires only about half as much $P_e$ correction for non-barite mudcake or standoff compared to the long-spaced detector with a larger azimuthal and vertical aperture. Therefore, the preferred embodiment provides borehole compensation for the short-spaced $P_{eS}$ using the borehole related difference between the two $P_e$ measurements $P_{eS}$ (short-spaced) and $P_{eL}$ (long-spaced), as described above.

The increased photoelectric attenuation at lower energies in higher $P_e$ formations, such as limestone, is most effectively measured with a lithology ratio, R, of counts in a "hard" Compton dominated high energy range to those in a "soft" photoelectrically sensitive lower energy range. The presently preferred energy ranges have been determined from analysis of spectral data to obtain maximum photoelectric signal to noise sensitivity. In the present invention, the preferred hard range is about 120–500 KeV, and the soft about 40–90 KeV.

Figure 6:
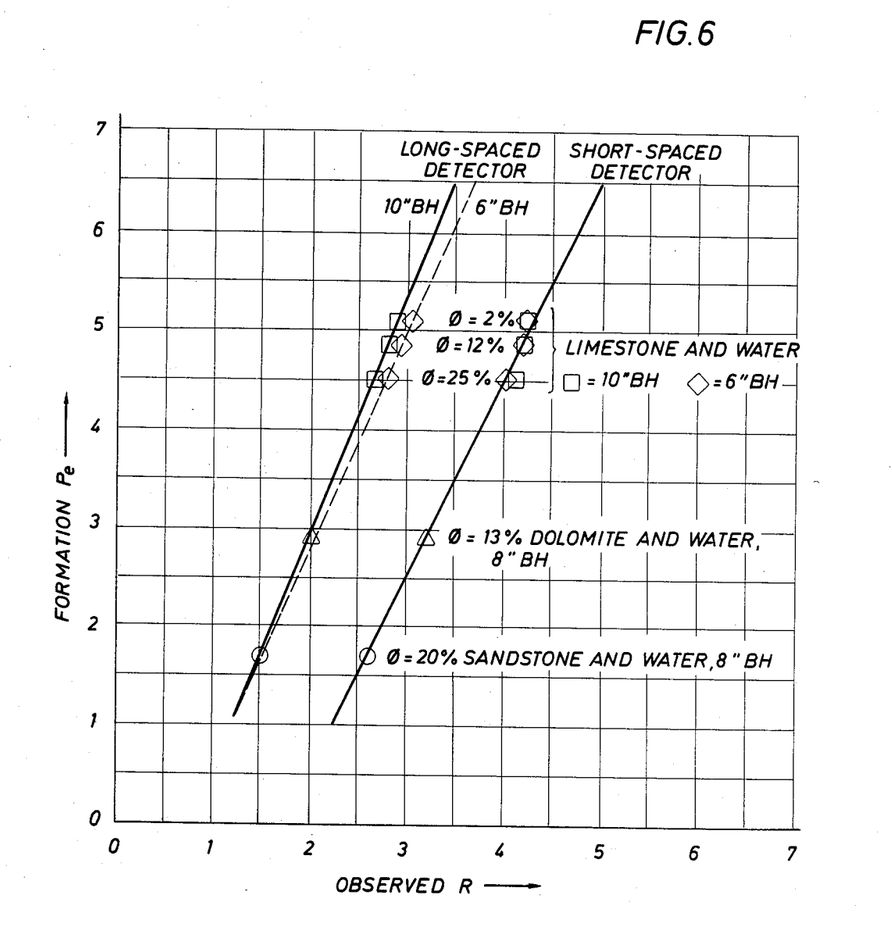
FIG. 6 is a graphical illustration of test formation data showing observed lithology ratios (R) versus formation $P_e$.

Detectors 22 and 23 yield photoelectric ratios, $R_S$ and $R_L$, respectively, which can be converted into $P_e$ values using relationships derived in known $P_e$ test formations. FIG. 6 illustrates $R_S$ and $R_L$ versus known $P_e$ for selected sand, dolomite, and limestone test formations, with fresh water boreholes and no mudcake or standoff. Data are shown for both 6 and 10 inch diameter boreholes in the limestone formations. Several things are apparent from the Figure. First, the R to $P_e$ conversion relation is almost linear in each detector, and both $R_L$ and $R_S$ have similar dynamic ranges. Also, for a given $P_e$ formation, a consistently higher ratio is observed in the short-spaced detector. This is caused by the different collimation apertures of the two detectors, and also because the short-spaced detector is more likely to observe single Compton scattered events than the long-spaced detector.

These effects induce slight differences in the spectral shapes from the two detectors, and hence different R values are observed. The tighter short-spaced detector collimation can also induce a slight density based sensitivity in $R_S$ (not significant in FIG. 6). Another feature, apparent from the 6 and 10 inch borehole data, is that there is a larger borehole (size) sensitivity in $R_L$ than $R_S$. This effect, mentioned above, will now be amplified further.

Since it is possible to make independent $P_e$ measurements in each detector, it would at first appear tempting to compensate the long-spaced $P_e$ using the short-spaced $P_e$, in a manner analagous to the well-known compensated density measurement. As is now clear, however, there are significant differences in the density and $P_e$ measurement concepts. The entire source-to-detector spacing enters into the density measurement, in large part due to the more penetrating nature of the higher energy gamma rays observed. Hence, the effective formation pathlengths contributing to the density measurement are considerably different in the two detectors due to the different spacings. In addition, the more energetic gamma rays are highly directional. These factors tend to maximize the differences in the formation signals (pathlengths) observed. At the same time, differences in the borehole components in each detector in the density measurement are minimized since the collimated gammas tend to transverse similar borehole pathlengths between the source 21 and each of the detectors 22 and 23. The net result is a change in the relative borehole to formation component signals at the two spacings, which leads to the compensated density measurement discussed earlier.

The photoelectric signal, however, is very short range (on the order of one inch). Therefore, the effective photoelectric "source" is located in the formation approximately opposite each detector. Hence, unlike the principle involved in density measurements, the formation pathlengths contributing to the photoelectrical signals in both detectors are similar, and the source-to-detector spacing in the tool itself is not important. Neither is the source energy, since, as also mentioned earlier, it has been shown that a similar photoelectric measurement can be made using the natural gamma sources in the formation.

Pathlength independence is not true of the borehole components of the photoelectric signals in the two detectors, however (particularly in non-barite boreholes). The solid angle of the collimation aperture from the formation into each detector controls the relative photoelectric borehole sensitivity in that detector. A wider aperture permits longer gamma ray pathlengths in the borehole medium (mudcake or mud) prior to detection, and hence more borehole dependence. This effect is enhanced by the isotropic nature of the formation photoelectric gamma "source", which emphasizes (longer) non-radial borehole path-lengths into less collimated detectors. A tightly collimated detector, conversely, accentuates the measurement of radial (straight-in) gamma rays, which have shorter average borehole pathlengths.

Figure 7:
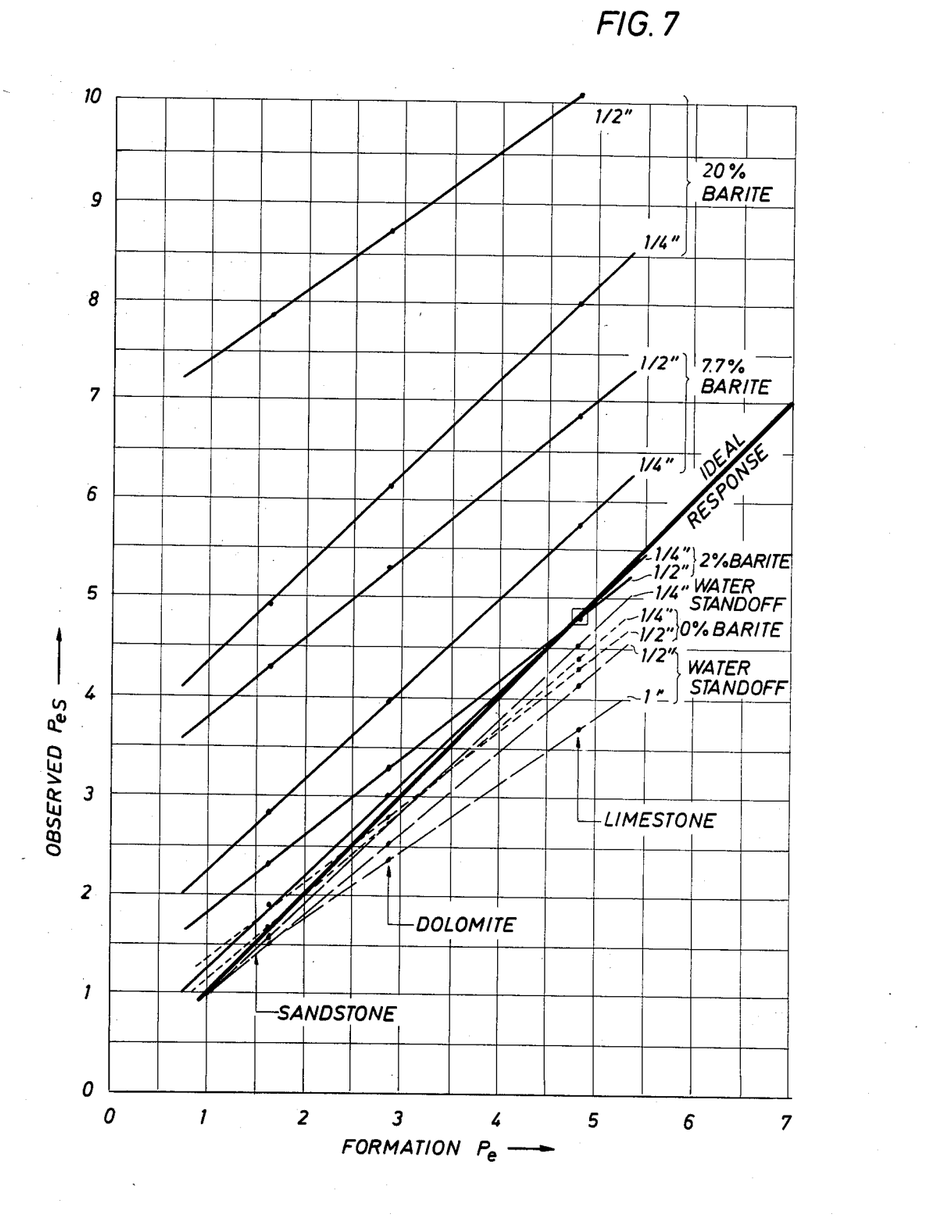
FIG. 7 is a graphical illustration of test formation data showing observed short-spaced detector $P_{eS}$ versus formation $P_e$.
Figure 8:
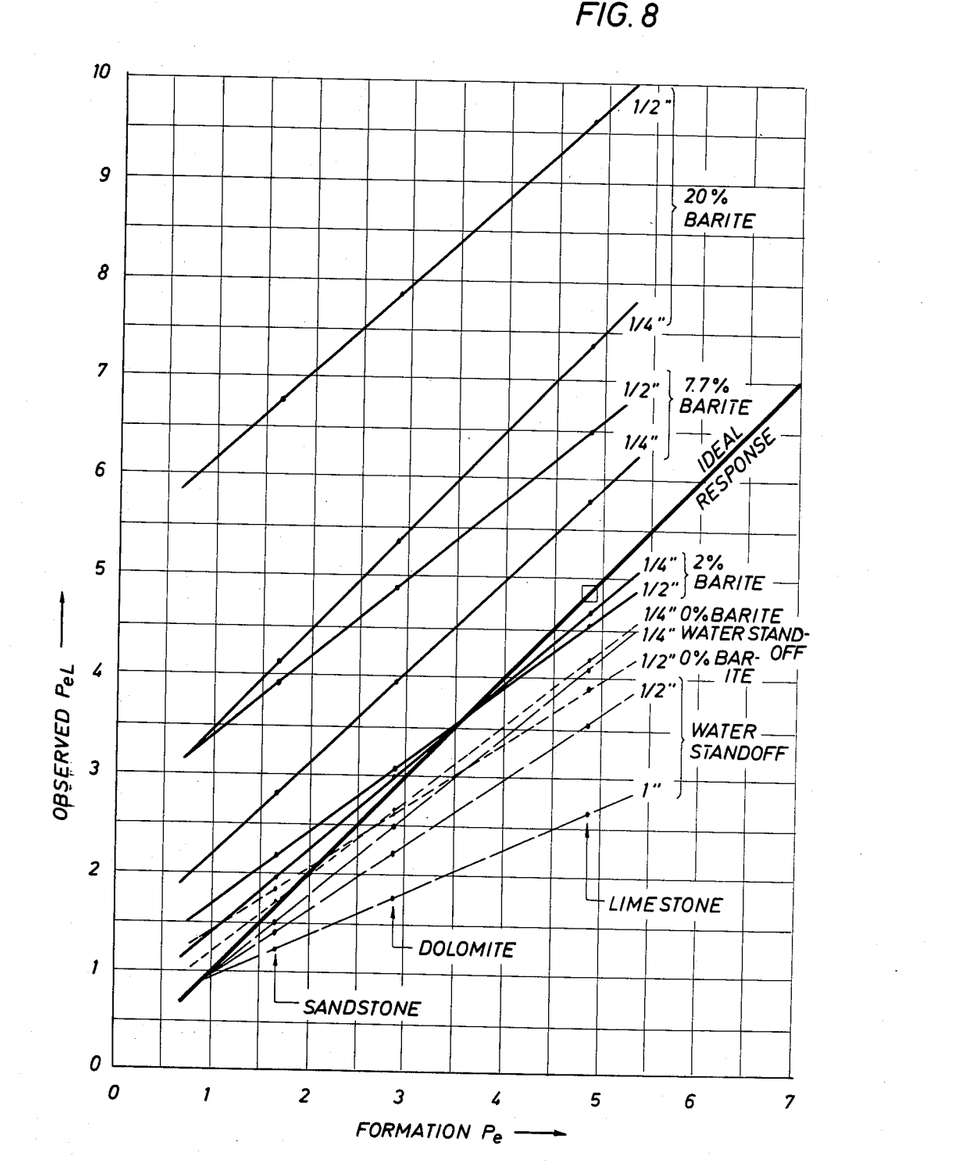
FIG. 8 is a graphical illustration of test formation data showing observed long-spaced detector $P_{eL}$ versus formation $P_e$.

The net result of these effects is that the tightly collimated short-spaced $P_{eS}$ measurement of detector 22, particularly in non-barite muds, has a smaller relative borehole component, and is less sensitive to borehole rugosity, standoff, and mudcake, than is the long-spaced $P_{eL}$ measurement of detector 23. This directly contrasts with compensated density measurements in which the short-spaced detector is more borehole sensitive. The increased relative $P_{eL}$ borehole sensitivity is illustrated in the 6" and 10" borehole limestone data in FIG. 6. It is also shown in FIGS. 7 and 8, which depict known $P_e$ values in sand, limestone and dolomite test formations versus apparent $P_{eS}$ and $P_{eL}$ values measured by the present invention. A variety of borehole conditions is shown. Standoff data refers to tool standoff from the borehole wall in fresh water; mudcake data includes both barite (2%, 8%, 20%) and non-barite (47% $Al_2O_3$) simulated cakes interposed between the tool and the formation.

Note in the short-spaced $P_{eS}$ data in FIG. 7 that all the standoffs and non-barite mudcakes induce smaller deviations from the nominal calibration curve than the corresponding materials adjacent to the long-spaced detector (FIG. 8). This is especially true in the limestone formation where the contrast between borehole $P_e$ and formation $P_e$ is greatest. As an illustration, a 0.5-inch-thick non-barite mudcake between the tool pad and a $P_e=4.85$ limestone causes the long-spaced detector to read an apparent $P_{eL}=3.85$. The short-spaced detector obtains an apparent $P_{eS}=4.3$, only about half as much in error. A one-inch water standoff (which could easily be caused downhole by borehole rugosity or washouts) in the same $P_e=4.85$ formation causes an apparent $P_{eL}=2.6$ and $P_{eS}=3.7$, again only about one half the error in the short-spaced detector.

Barite mudcakes, and in particular when there is more than just a few percent barite present, cause both detectors to indicate much too high $P_e$ values in all formations, since barium has a very high $P_e$. There is still, however, a significant formation $P_e$ sensitivity, as evidenced by the slopes of the curves in FIGS. 7 and 8, even with as much as 0.5 in. of 20% barite mudcake present. There is also a slight difference in $P_e$ barite sensitivity in the two detectors. However, field experience has indicated that small systematic errors (such as tool skew, rotation, or differential standoff) can override these differences. In barite boreholes, therefore, $P_e$ differences can be indicative of mudcake, washout, slight differential standoff, or tool skew. In general, both $P_e$ values in all these situations will be too high.

In non-barite muds where the two $P_e$ values are in agreement, it is likely that both detectors are reading the true formation $P_e$. Where the two $P_e$ values differ, the presence of mudcake or washout is indicated. In such zones both $P_e$ values are probably low, with $P_{eS}$ closer to the true formation value since it is less influenced by the intervening non-barite material.

Observable photoelectric absorption of low energy scattered gamma rays in downhole formations takes place regardless of the origin of the gamma radiation. Neutron induced secondary gamma sources in formations give rise to photoelectric absorption reactions, but a large number of secondary gamma sources are also generated in the borehole fluid, casing, and/or cement. These induced borehole gamma rays are detected without having undergone photoelectric absorption in the formation, and hence strongly mask the formation photoelectric signature. Density tool gamma sources on the other hand, such as source 21, are collimated into the formation, as are the detectors 22 and 23. This minimizes borehole interference and makes formation photoelectric absorption measurements possible. Since natural gamma sources are located in the formation in the first place (casing, cement, and most borehole fluids are relatively inert), natural gamma spectroscopy also lends itself to the measurement of formation photoelectric absorption. Natural gamma based photoelectric measurements are more borehole sensitive than density tool based measurements, however, because the detectors in such tools are not usually collimated into the formation.

As may be seen, therefore, the present invention has numerous advantages. Since $P_e$ measurements made with density logging tools have a very limited depth of investigation, it is desirable to have a direct indication of borehole induced errors in the observed $P_e$ values. The method and apparatus according to the present invention have been designed to provide this information, along with accurate and repeatable compensated density and $P_e$ measurements. Photoelectric ratio measurements made in each detector 22 and 23 are independently converted into $P_{eS}$ and $P_{eL}$ values. Extensive test formation and field log data in both barite and non-barite boreholes have been analyzed, and comparisons of the results from the present invention with natural gamma spectroscopy derived photoelectric logs have been made. These data confirm that due to collimation differences, long-spaced detector $P_e$ measurements are more influenced by borehole conditions than short-spaced detector $P_e$ measurements.

The present invention is extremely versatile, and lends itself well to other measurements, such as neutron porosity. Two density measurements can be made at the same detector spacing above and below the source, but with different azimuthal and/or vertical apertures. The spacing and aperture compensation concepts can also be combined, with the short-spaced detector having the larger aperture, so that it is more sensitive to the borehole. Energy dependence can even be employed, since in a density measurement the scattered gamma rays from the near borehole tend to be higher in energy. The invention thus furnishes a new and powerful borehole compensation method and apparatus which are readily suited to the widest use in the borehole measurement of earth formation properties.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. For use in logging downhole earth formations penetrated by a borehole, a method for compensating measured gamma radiation for borehole effects on the photoelectric component thereof, comprising:

(a) measuring, with a first detector within the borehole, relatively low energy gamma radiation in the photoelectric effect energy range entering the borehole along a first predetermined path, and generating a first signal representative of the gamma radiation so measured, (b) measuring, with a second detector within the borehole, relatively low energy gamma radiation in the photoelectric effect energy range entering the borehole along a second predetermined path different from the first path, and generating a second signal representative of the gamma radiation so measured, (c) selecting said predetermined first and second paths such that differences in relative formation components of said first and second signals are minimized, and relative borehole components thereof are varied, and (d) determining, as a function of said representative signals, the borehole effects thereon.

2. The method of claim 1 further comprising compensating at least one of said signals for the borehole effects thereon.

3. The method of claim 1 wherein said steps of detecting low energy scattered gamma radiation each further comprise detecting low energy scattered gamma radiation having a substantially isotropic distribution substantially equivalent to a photoelectric source located in a volume of the formation substantially adjacent the respective said detector.

4. The method of claim 3 further comprising physically varying the relative borehole path lengths along the first and second paths, while the effective formation signals for the first and second detectors remains substantially the same.

5. The method of claim 4 wherein said step of physically varying the relative borehole path lengths along the first and second paths further comprises measuring the radiations using different effective aperture widths in the detectors.

6. The method of claim 5 further comprising deriving from said signals a measure of the photoelectric absorption properties of the formation.

7. For use in logging downhole earth formations penetrated by a borehole, a method for compensating for borehole effects in a photoelectric component of measured gamma radiation, comprising:

(a) irradiating formations penetrated by a well borehole with a source of relatively low energy gamma rays;

(b) detecting and measuring, with a first spaced apart detector within the borehole, low energy scattered gamma radiation having a generally isotropic distribution substantially equivalent to a photoelectrically sensitive source located in a volume of the formation substantially adjacent the detector, and entering the borehole along a first predetermined path, (c) generating a first signal representative of the radiation so measured, (d) detecting and measuring, with a second differently spaced apart detector within the borehole, low energy scattered gamma radiation having a generally isotropic distribution substantially equivalent to a photoelectrically sensitive source located in a volume of the formation substantially adjacent the second detector, and entering the borehole along a second predetermined path, (e) generating a second signal representative of the radiation measured by the second detector, (f) selecting said predetermined first and second paths such that differences in relative formation components of said first and second signals are minimized, and relative borehole components thereof are physically varied, while the effective formation source-to-detector spacing for the first and second detectors remains substantially the same, the borehole components being physically varied by measuring the radiations using different effective aperture widths in the detectors, the larger aperture thereby effectively increasing the relative borehole path length to its detector, and thus the relative borehole effects upon the radiations measured thereby, (g) determining, as a predetermined function of said signals, the borehole effects thereon, (h) compensating at least one of said signals for the borehole effects thereon, and (i) deriving from said signals a measure of the photoelectric absorption properties of the formation.

* * * * *